United States Patent [19]
Hellon et al.

[11] Patent Number: 5,492,428
[45] Date of Patent: Feb. 20, 1996

[54] BALL JOINT ASSEMBLY

[75] Inventors: Keith Hellon, Libertyville; Jiri Pazdirek, Schaumburg, both of Ill.

[73] Assignee: MacLean-Fogg Company, Mundelein, Ill.

[21] Appl. No.: 430,139

[22] Filed: Apr. 26, 1995

Related U.S. Application Data

[60] Continuation of Ser. No. 102,627, Aug. 5, 1993, abandoned, which is a division of Ser. No. 46,566, Apr. 13, 1993, abandoned, which is a continuation-in-part of Ser. No. 846,820, Mar. 6, 1992, abandoned, which is a continuation-in-part of Ser. No. 789,165, Nov. 8, 1991, abandoned.

[51] Int. Cl.$^6$ .................................................. F16C 11/00
[52] U.S. Cl. .................... 403/122; 403/135; 403/134; 403/77
[58] Field of Search .................... 403/130–135, 403/137–143, 127, 128, 122

[56] References Cited

U.S. PATENT DOCUMENTS

| | | | |
|---|---|---|---|
| 1,779,459 | 10/1930 | Austin . | |
| 1,986,149 | 1/1935 | Harris | 403/122 X |
| 2,905,492 | 9/1959 | Alexander | 287/87 |
| 2,908,507 | 10/1959 | Blanks, Sr. et al. | 403/134 X |
| 3,036,366 | 5/1962 | Ricks | 29/149.5 |
| 3,089,198 | 5/1963 | Eirhart, Jr. | 18/59 |
| 3,094,376 | 6/1963 | Thomas | 18/59 |
| 3,147,025 | 9/1964 | Good | 280/96.2 |
| 3,255,623 | 6/1966 | Ricks | 72/256 |
| 3,259,963 | 7/1966 | White | 29/149.5 |
| 3,342,513 | 9/1967 | Melton et al. | 287/90 |
| 3,545,797 | 12/1970 | Korecky | 403/140 X |
| 3,591,669 | 7/1971 | Memory | 264/101 |
| 3,941,495 | 3/1976 | Duncan | 403/267 |
| 4,073,178 | 2/1978 | Dutartre et al. | 72/352 |
| 4,134,842 | 1/1979 | Orkin et al. | 252/12.6 |
| 4,247,512 | 1/1981 | Lobeck et al. | 264/242 |
| 4,290,181 | 9/1981 | Jackson | 29/458 |
| 4,427,310 | 1/1984 | Middleton | 384/415 |
| 4,527,924 | 7/1985 | Asberg | 403/138 X |
| 4,691,422 | 9/1987 | Tilgner et al. | 29/149.5 B |
| 4,695,182 | 9/1987 | Wood, Jr. | 403/140 |
| 4,781,877 | 11/1988 | Rabe | 264/266 |
| 4,916,788 | 4/1990 | Mitoya | 29/898.044 |
| 5,009,538 | 4/1991 | Shirai et al. | 403/134 |
| 5,011,320 | 4/1991 | Love et al. | 403/132 |
| 5,011,321 | 4/1991 | Kidokoro | 403/140 |
| 5,011,322 | 4/1991 | Schauwecker | 403/141 |
| 5,066,159 | 11/1991 | Urbach | 403/134 |
| 5,152,628 | 10/1992 | Broszat et al. | 403/140 |

FOREIGN PATENT DOCUMENTS

| | | | |
|---|---|---|---|
| 0027770 | 4/1981 | European Pat. Off. . | |
| 2436279 | 4/1980 | France . | |
| 3630337C1 | 10/1987 | Germany . | |
| 249203 | 6/1970 | U.S.S.R. | 403/134 |
| 308899 | 7/1971 | U.S.S.R. . | |
| 794611 | 5/1958 | United Kingdom . | |
| 806897 | 1/1959 | United Kingdom | 403/138 |
| 855197 | 11/1960 | United Kingdom . | |
| 1005682 | 9/1965 | United Kingdom | 403/140 |

*Primary Examiner*—Eric K. Nicholson
*Assistant Examiner*—Harry C. Kim
*Attorney, Agent, or Firm*—Willian Brinks Hofer Gilson & Lione

[57] ABSTRACT

A ball joint assembly includes a ball stud and bearing sub-assembly that is economical to manufacture, strong, durable and long-lasting. The bearing is molded directly on the ball surface of the ball, thereby eliminating the need for precise tolerances in machining the ball. Microcavities formed on the ball surface facilitate the introduction of lubricant between the ball and the bearing. A two-piece stud and collar nut adds ease of manufacture.

12 Claims, 5 Drawing Sheets

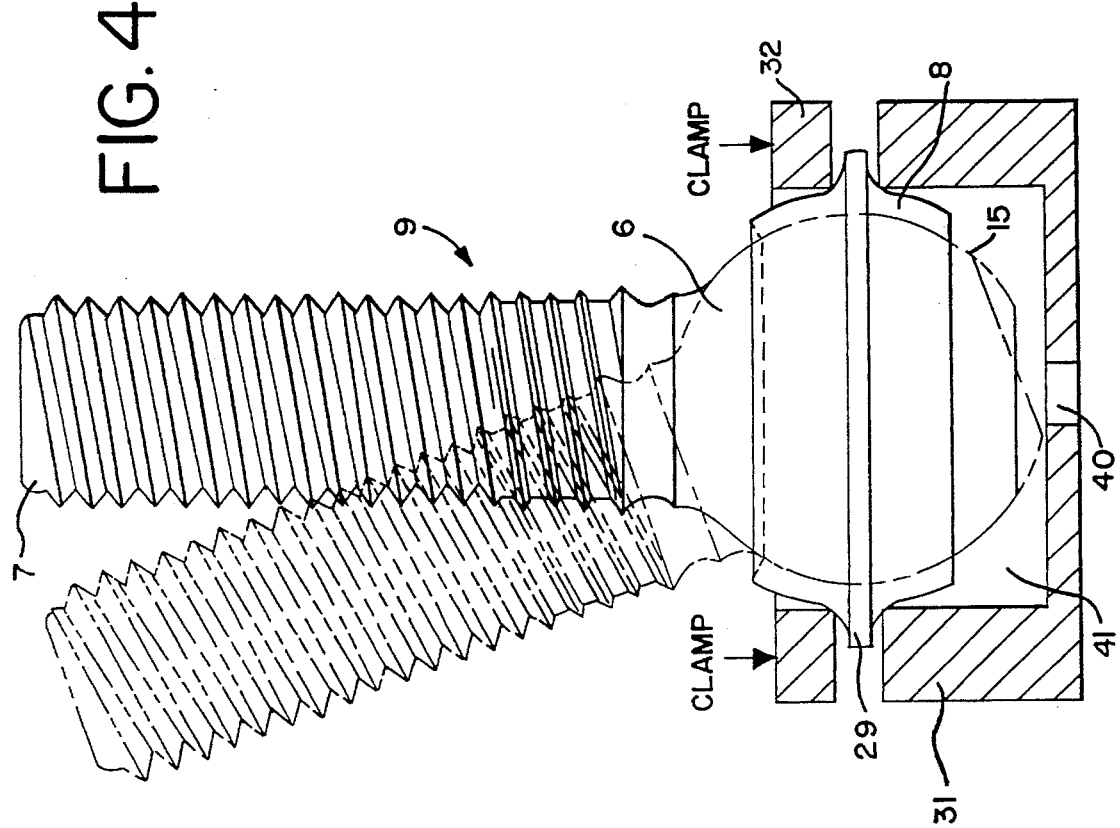
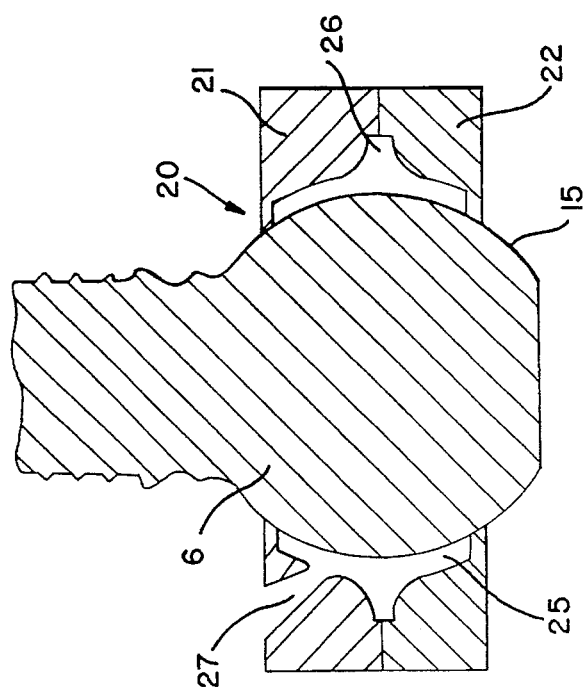
FIG. 4
FIG. 3

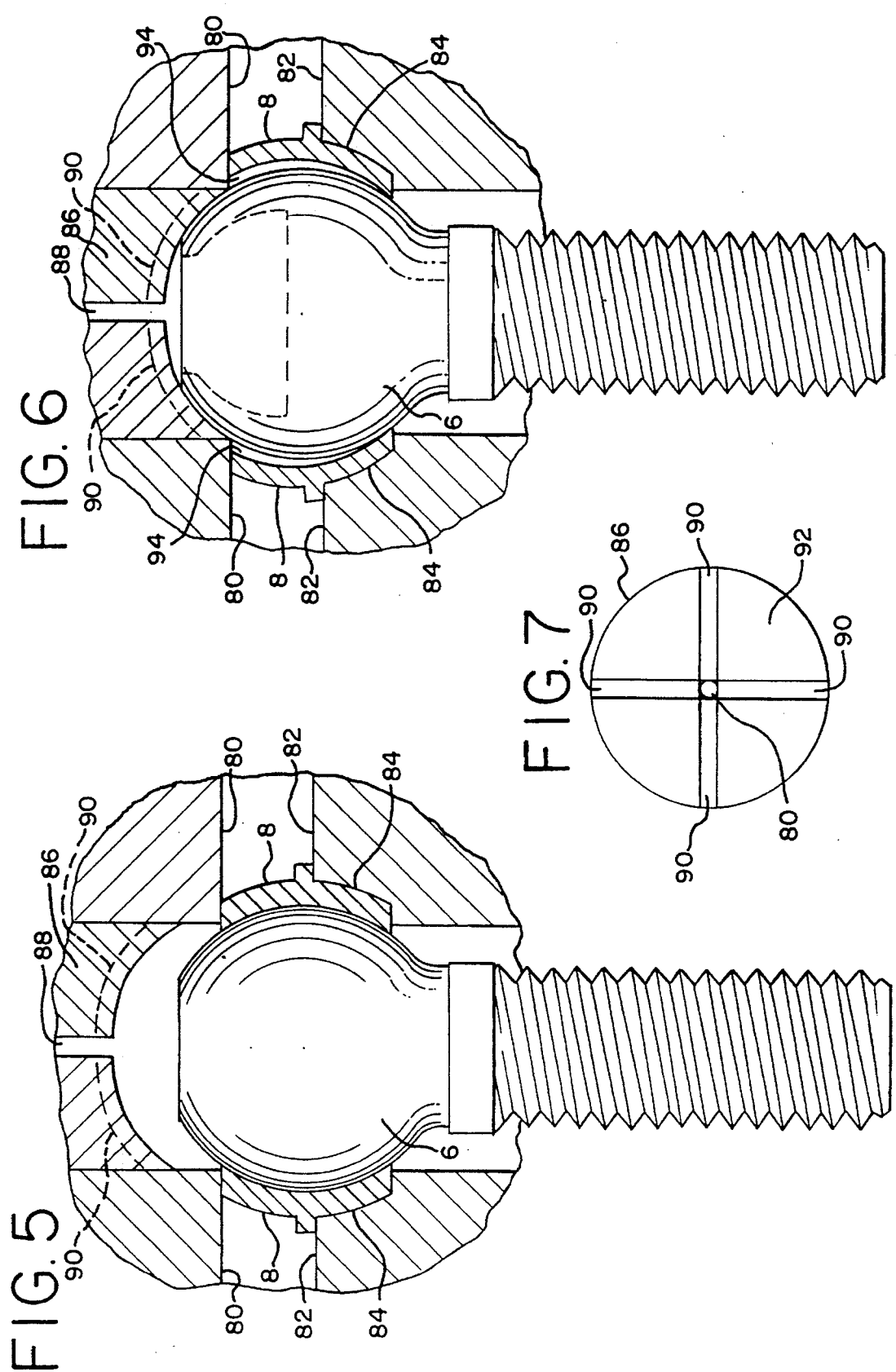

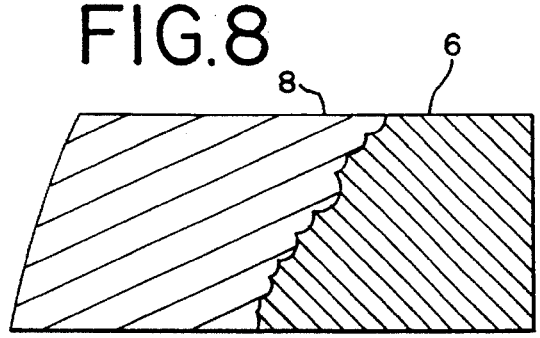
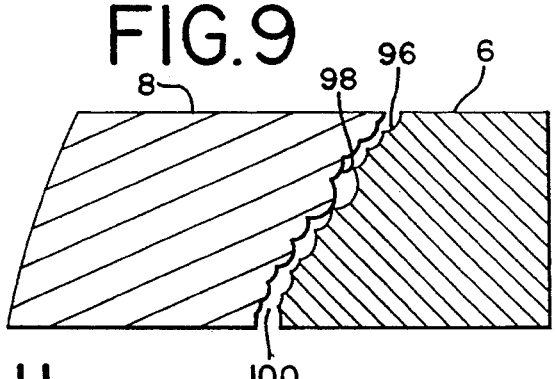
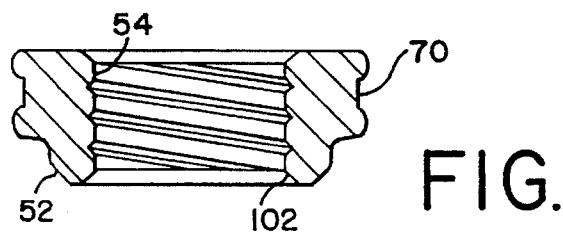
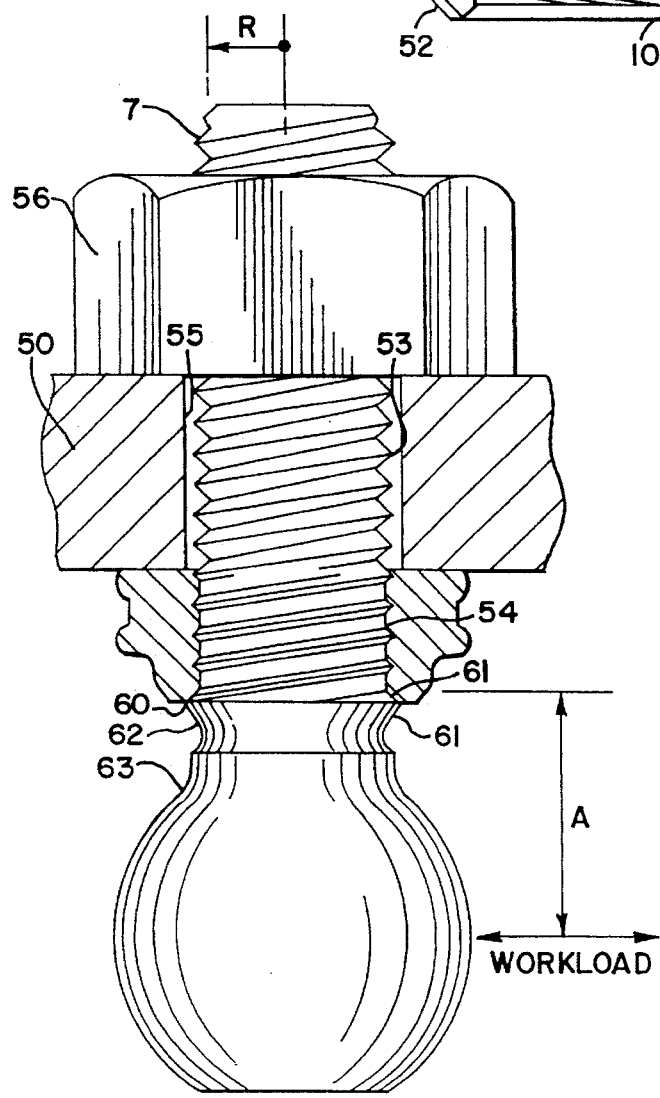
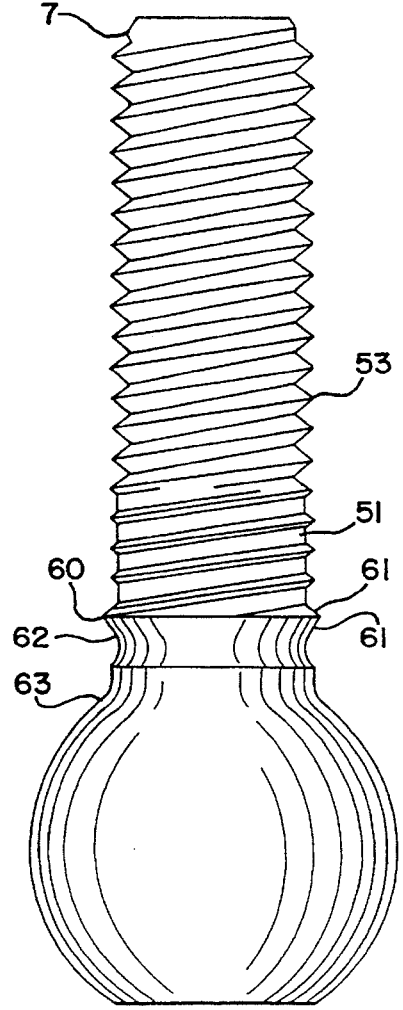

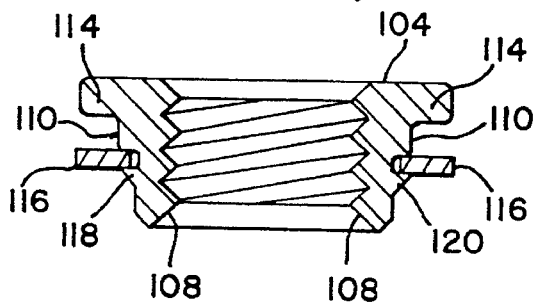
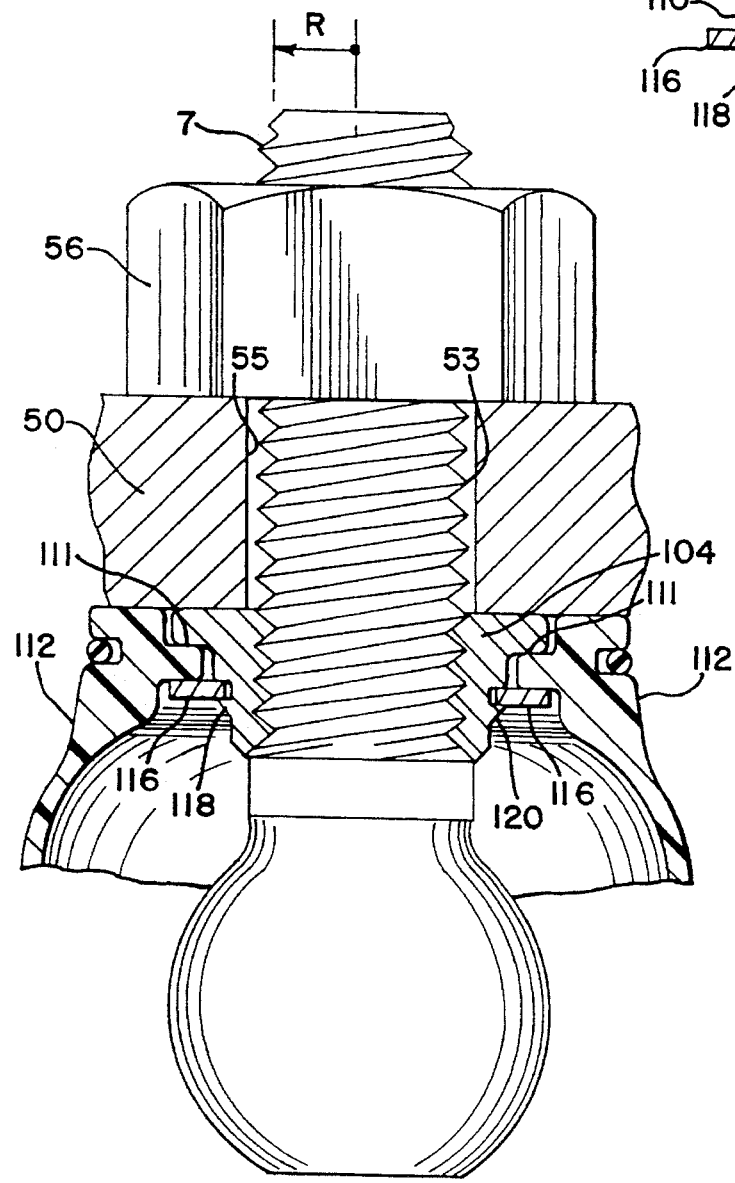
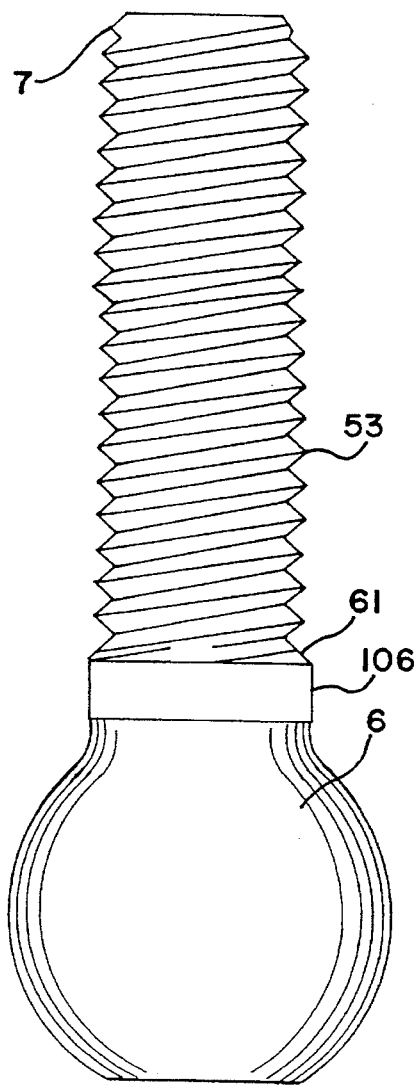

BALL JOINT ASSEMBLY

RELATED APPLICATION

This application is a continuation of application Ser. No. 08/102,627, filed Aug. 5, 1993, which is a division of application Ser. No. 08/046,566, filed Apr. 13, 1993, which is a continuation-in-part of application Ser. No. 07/846,820, filed Mar. 6, 1992, which is a continuation-in-part of application Ser. No. 07/789,165, filed Nov. 8, 1991, all of which are now abandoned. The entire disclosure of each of the two abandoned applications is incorporated herein by reference.

FIELD OF THE INVENTION

This invention relates in general to ball joint assemblies. It relates particularly to a ball joint assembly of the type which is normally used for connecting movable parts in a vehicle suspension system.

BACKGROUND OF THE INVENTION

Automobiles and other vehicles normally incorporate suspension systems designed to absorb road shock and other vibrations. Many vehicles are provided with independent suspensions located at each wheel. These suspensions are designed to independently minimize the effect of shock loading on each of the wheels.

Suspension systems commonly employ stabilizer bars which interconnect independent suspensions on opposite wheels and are effective to increase the roll rigidity and improve the steering stability of the vehicle. The stabilizer bars are connected to each wheel suspension by suspension links through ball joint assemblies.

Conventional ball joint assemblies comprise a ball stud seated in a socket. In a suspension link, each end of the link incorporates a socket, and a ball is seated in each socket. The stud, which extends from the ball in one ball joint assembly, is connected to a wheel suspension component. The stud extending from the ball in the other ball joint assembly is connected to one end of a stabilizer bar.

The socket in a ball joint assembly typically incorporates a bearing made from a plastic resin. The outer surface of the ball seats on the inner surface of the bearing and the stud extends out of the socket. The ball stud is free to move universally through a conical angle of approximately 30 degrees relative to the socket.

In prior art ball joint assemblies it was conventional to machine the ball surface to reduce friction between the ball and the bearing. It is also known in the prior art, as shown in Jackson U.S. Pat. No. 4,290,181, to construct a ball joint wherein a plastic bearing member is molded in the ball joint socket with the ball in place. Jackson states that the ball must be rotated while the bearing material congeals in order to form a suitable bearing surface.

The stud portion of the ball is conventionally connected to a wheel suspension component, for example, by fastening the component between a plate fitted onto an inner portion of the stud and a nut threaded onto the threaded outer end of the stud, as seen in Kidokoro U.S. Pat. No. 5,011,321. It is also known to form the plate integrally with the stud, in the form of a flange or collar, as seen in Shirai et al. U.S. Pat. No. 5,009,538.

SUMMARY OF THE INVENTION

It is an object of the present invention to provide an improved ball joint assembly.

It is another object to provide a ball joint assembly which is simple and inexpensive to manufacture.

It is still another object to provide a ball joint assembly with an improved bearing construction.

It is a further object to provide a new and improved ball stud and bearing sub-assembly.

It is yet another object to provide a ball joint assembly with an improved stud and collar construction, which is easily manufactured and in which the ability of the stud to absorb stress is enhanced.

It is yet another object to provide a ball joint assembly with an improved bearing construction, which is easily manufactured and in which the ability of the stud to absorb stress is enhanced.

It is a further object to provide a new and improved method of manufacturing a ball joint assembly.

The foregoing and other objects are realized in accord with the present invention by forming a ball stud with an unfinished ball surface by conventional techniques. The outer surface of the ball is then treated by wheelabrating in a known manner, using a Wheelabrator machine, for example, to form myriad microcavities on the surface. Viscous bearing material is then brought into contact with a portion of the ball surface enclosed in a mold. The material is allowed to harden on the ball.

The hardened bearing is clamped in a fixture, and lubricant is applied to the exposed portion of the ball surface. Preferably, the lubricant is applied by first pulling the bearing and the ball from each other such that a space is formed therebetween, and then placing the lubricant in this space between the bearing and the ball. The lubricant has sufficiently low viscosity to flow into the microcavities such that a thin film of lubricant is now present between the ball and the bearing. The ball can now be moved relative to the bearing by moving the stud, causing the lubricant to further flow into the microcavities between the bearing and the ball as the stud is worked back, forth and around.

The bearing may be formed in an overall ring-shape that only partially covers the lower half of the ball surface opposite the stud. Thus, the bearing establishes a point of leverage for the ball stud that effectively reduces the lever arm of the ball stud.

BRIEF DESCRIPTION OF THE DRAWINGS

The invention, including its construction and method of operation, together with additional objects and advantages thereof, is illustrated more or less diagrammatically in the drawings, in which:

FIG. 3 is a sectional view of the ball stud shown in FIG. 2, seated in a mold;

FIG. 4 is a sectional view of the ball stud and bearing sub-assembly placed in a clamp, including shadow lines illustrating the movement of the ball stud in the clamp;

FIG. 5 is a partial sectional view through a modified form of ball stud and bearing sub-assembly placed in a clamp for lubricating the ball stud and bearing sub-assembly;

FIG. 6 is another partial sectional view of the sub-assembly and clamp shown in FIG. 5;

FIG. 7 is a bottom plan view of the plunger illustrated in FIGS. 5 and 6;

FIG. 8 is a partial sectional view of the interface between a bearing and ball after the bearing has been formed on the ball surface;

FIG. 9 is a partial sectional view of the interface between a bearing and ball after a lubricant layer has been introduced between the bearing and the ball by either of the methods shown in FIGS. 4 and 5;

FIG. 10 is a partial sectional view through one embodiment of a ball stud and wheel suspension component assembly embodying features of the present invention;

FIG. 11 is a section view through a collar nut in the assembly of FIG. 10;

FIG. 12 illustrates the ball stud in the assembly of FIG. 10;

FIG. 13 is a partial sectional view through another embodiment of a ball stud and a wheel suspension component assembly;

FIG. 14 is a sectional view through a collar nut in the assembly of FIG. 13; and FIG. 15 illustrates the ball stud in the assembly of FIG. 13.

DETAILED DESCRIPTION OF THE PREFERRED EMBODIMENT

Figures 1, 2:
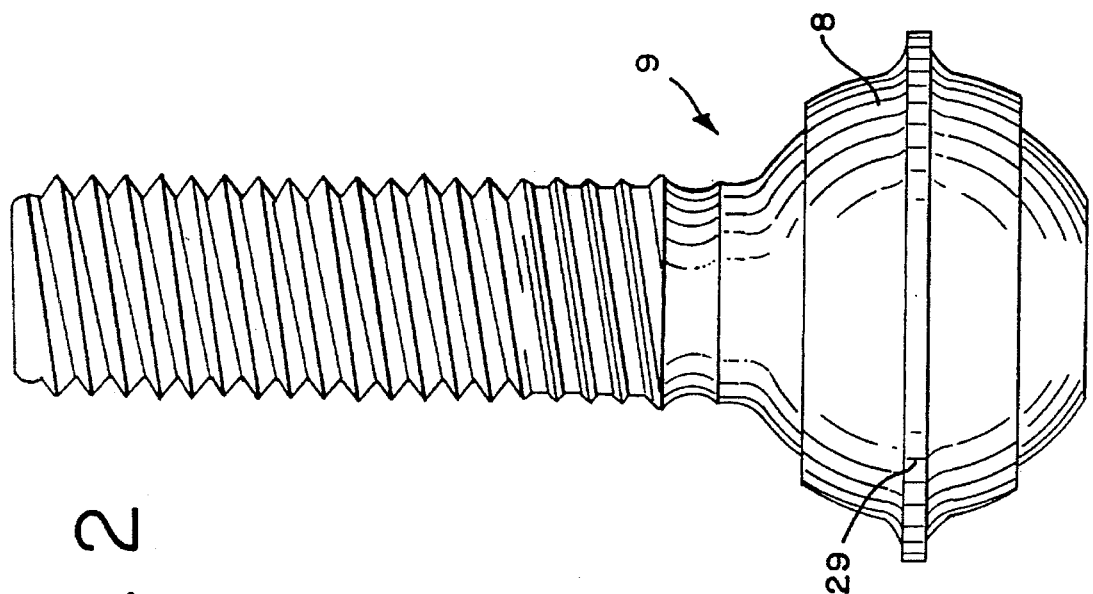
FIG. 1 is a partial sectional view through one embodiment of a ball joint assembly embodying features of the present invention, with parts removed.
FIG. 2 is an elevational view of the ball stud and bearing sub-assembly in the one embodiment of a ball joint assembly embodying features of the present invention.

Referring now to the drawings, and particularly to FIGS. 1 and 2, a ball joint assembly embodying features of the present invention is seen generally at 5. The assembly 5 includes a unitary ball 6 and stud 7, with the ball seated in a bearing 8 to form a ball stud and bearing sub-assembly 9. The bearing 8 of the sub-assembly 9 is clamped into one end of an automobile suspension link 10.

The ball 6 and stud 7 are a one-piece construction made from steel. Generally speaking, the ball stud illustrated in the drawings may be achieved by cold forming and/or roll-forming steel in a manner well within the ability of one skilled in the art.

The ball 6 is then treated to create a myriad of microcavities on its surface 15. The microcavities are formed by impelling or "peening" cast steel shot at the ball surface under pressure. This may be accomplished by "wheelabrating" using a conventional machine known as a "Wheelabrator". The Wheelabrator machine tumbles parts on an endless belt during the impelling of shot. The microcavities must be small enough to prevent viscous bearing material from flowing into them. Small shot size is used in the machine to assure this result.

The steel shot is preferably S170 SAE grade, which contains diameters of shot from about 0.0138 inch diameter to about 0.0331 inch in diameter. The shot creates the myriad of microcavities, which are generally radiused hollows smaller than about 0.005 inch deep. The microcavities vary in depth, and thus the transition between adjacent microcavities is not well defined, and the microcavities are preferably randomly positioned on the surface without a repeated pattern.

Referring now to FIG. 3, the bearing 8 is formed directly on the surface 15 of the ball 6 by placing the ball in a mold 20 and injecting viscous bearing material therein. Prior to placing the ball 6 inside the mold 20, the ball is cleaned to remove any grease, mold release or other foreign matter from the ball surface 15 so that such matter is not pushed by the advancing viscous bearing material to a point farthest from the inlet, thereby causing the hardened bearing to have a knit line which can crack easily.

The mold 20 comprises an upper mold section 21 and a lower mold section 22. When mated together in the manner illustrated over the surface 15 of the ball, they form a generally ring-shaped mold cavity 25 over a portion of that surface. The cavity 25 conforms generally to the shape of the ball surface 15 except that an annular cavity extension 26 is defined around its periphery. An injection inlet 27 provides access to the cavity 25, 26.

Viscous bearing material in the form of a thermoplastic resin is injected into the mold through inlet 27. In the preferred embodiment, acetal is injected at a temperature between 365° and 435° F. After the viscous bearing material hardens, the ball stud 6, 7 and bearing 8 are removed from the mold by separating the mold halves 21 and 22. The bearing 8 is generally ring-shaped and has a plastic flange 29 formed around its circumference, as best seen in FIGS. 2 and 4. The projected area of the bearing is equally divided above and below the annular flange so that resultant force passes through the center of the ball, creating the shortest moment-arm for force applied to the stud.

After removal from the mold, full shrinkage of the plastic bearing 8 takes place in approximately 24 hours. At this point the ball 6 is locked inside the bearing 8, i.e., it will not move freely.

In order to facilitate the desired movement of the ball 6 on the bearing 8, lubricant is introduced between the ball 6 and the bearing 8. This may be accomplished in the manner shown in FIG. 4. As seen in FIG. 4, the ball stud and bearing sub-assembly 9 is placed between two fixtures 31 and 32. These fixtures 31, 32 seat tightly against the outside surface of the bearing 8 with the flange 29 between them. The fixtures 31, 32 are pressed against the bearing 8 by clamps (not shown) so as to rigidly fix the ball 6 and bearing 8 in place.

An inlet port 40 is located at one end of the fixture 31 and provides a path for the introduction of lubricant into the space 41 overlying the bearing surface 15 at the free end of the ball 6. A lubricant having a coefficient of viscosity low enough to flow into the microcavities is introduced to the space 41 through the port 40. The ball stud 7 is moved back, forth and around as the lubricant is introduced. Part of the desired movement is illustrated by the phantom lines shown in FIG. 4. As the ball 6 moves, lubricant in the microcavities on the surface 15 exposed in space 41 works its way between the opposed surfaces of the ball 6 and the bearing 8.

FIG. 4 also illustrates the full range of motion for the ball stud 6, 7 in relation to the bearing 8. This full range of motion is accommodated in the entire ball stud sub-assembly 9 when seated in a link 10, as shown in FIG. 1.

FIGS. 5 and 6 illustrate a modified version of the earlier described method of introducing lubricant between the ball 6 and the bearing 8. The ball stud and bearing sub-assembly 9 is initially placed between two fixtures, 80 and 82, such that they seat tightly against the outside surface of the bearing 8 in the manner shown in FIG. 5. In particular, the first fixture 80 fits snugly against an upper annular edge of the bearing 8. The second fixture 82 includes a nest contoured to match a portion of the outer surface of the bearing 8 including the flange 29 and a lower annular edge of the bearing 8. The fixtures 80, 82 are pressed against the bearing 8 by clamps (not shown) so as to rigidly fix the ball 6 and bearing 8 in place.

The first fixture 80 includes a substantially cylindrical plunger 86 movably situated within the first fixture 80. The plunger 86 includes a central aperture 88 that extends through the length of the plunger 86. The central aperture 88 opens into a series of channels 90 formed on a bottom surface 92 of the plunger 86. A bottom view of the plunger 86, including the channels 90, is shown in FIG. 7.

The plunger 86 is initially withdrawn as shown in FIG. 5. The plunger 86 is then lowered against the ball 6 of the ball stud and bearing sub-assembly 9 as shown in FIG. 6. The fixtures 80, 82 hold the bearing 8 in place while the plunger 86 pushes the ball 6 and stud 7 down axially such that a space 94 is formed between the bearing 8 and the ball 6. A lubricant having a coefficient of viscosity low enough to flow into the microcavities is introduced to the space 94 through the central aperture 88 and the channels 90. The lubricant is preferably applied until it forms a relatively uniform layer between the bearing 8 and the ball 6. The plunger 86 is then released, and the ball 6 moves back toward the inner surface of the bearing 8, with the thin layer of lubricant therebetween.

The interface between the bearing 8 and ball 6 is further illustrated by the partial sectional view shown in FIGS. 8 and 9. In FIG. 8, the bearing 8 and ball 6 are shown after the bearing 8 has been formed on the ball 6. The microcavities 96 can be seen on the ball surface 15, and the inner wall 98 of the bearing 8 has conformed generally to the random pattern formed by the microcavities 96. In FIG. 9, the bearing 8 and the ball 6 are shown after the lubricant layer 100 has been introduced between the bearing 8 and the ball 6 by either of the methods described herein. The bearing 8 does not return to the completely mated position shown in FIG. 8. This is because of the microscopic differences between the ball surface 15 and the inner bearing surface 98, the nonsymmetrical pattern of the microcavities 96, and the presence of the lubricant layer 100 between the bearing 8 and the ball 6.

It will be seen that the aforedescribed methods of manufacturing the ball stud sub-assembly 9 provide substantial advantages. For example, the need for precise tolerances in machining the ball 6 is eliminated, and a well lubricated joint is achieved in a simple and efficient manner. In this regard, it should be recognized that a suitable ball 6 surface may be achieved by methods other than wheelabrating.

As seen in FIG. 1, the ball stud and bearing sub-assembly 9 is seated in the end of a suspension link 10 to form a ball joint assembly 5. The bearing 8 is held in place inside the link 10 end by securing the flange 29 between the sandwiched halves 45 and 46 of the link end. Because the bearing 8 is fixed in place inside the link end 10 by the flange 29, there is no need for the bearing 8 to conform completely to the inner surface of the link end halves 45 and 46. Thus, there is no need for maintaining close tolerances in forming the bearing 8.

Turning now to FIG. 10, a ball and stud 6, 7 are shown secured to a component 50 of a wheel suspension. The stud 7 has external threads 51. A reinforcing collar nut 52 having internal threads 54 and shown in detail in FIG. 6 is threaded onto the stud 7. The stud 7 is then passed through an aperture 55 in the component 50 and the exposed outer end of the stud 7 is secured by a clamp nut 56.

The ball stud 6, 7 and collar nut 52, being rigidly connected to the suspension component 50, is subjected to load forces that are placed on it through the vehicle suspension system. An example of one of these load forces is graphically illustrated by the double-head arrow in FIG. 10. The construction of the ball stud 6, 7 and collar nut 52 is particularly effective in transmitting these forces without damage.

Specifically, the stud 7 is roll-formed during manufacture to form a collar 60 around its mid-section. The collar 60 is formed at a cone angle of about 60 degrees. In forming the collar 60, which has converging frusto-conical faces 61, a groove 62 is left surrounding the stud below the collar and another groove 63 is left above it. The collar nut 52 is threaded on the stud 7, and a mating face 102 of the collar nut 52, also formed at a cone angle of about 60 degrees, is seated against the collar 60 with only a low torque. This low torque application of the collar nut 52 avoids simple cantilever loading of the shank (stud 7) of the ball-stud by redistributing the "work-load" to the outer diameter of the collar nut 52 and, therewith, clamping the stabilizing bar 50 between the collar nut and the flanged locknut. It also avoids algebraic addition of the loads on the ball-stud shank. The separate collar nut 52, beside the favorable force distribution, provides a ball stud that does not require machining to achieve proper operating clearance.

FIGS. 11 and 12 illustrate further details of one embodiment of the thread connection between the stud 7 and the collar nut 52. As seen in FIG. 12, the minor diameter of the threads 51 immediately below the collar 60 is larger than the minor diameter of the remaining threads 53 of stud 7. For ease of forming, the minor diameter of the threads immediately below the collar 60 may be made approximately equal to the normal pitch diameter of the remaining threads 53 on the stud 7. The mating threads 54 of the collar nut 52, as seen in FIG. 11, include a minor diameter corresponding to the size of the minor diameter of the threads 51 immediately below the collar 60.

The collar 52 is also formed with an annular groove 70 around its periphery. This groove is adapted to receive the outer end of a dust cover (not shown in FIGS. 11 and 12) in sealing relationship. The inner end of that same dust cover is then seated over the outwardly extending lip 71 on the link end half 46 (see FIG. 1). The separate collar nut, beside the favorable force distribution, provides a ball stud that does not require machining to achieve proper operating clearance.

Turning now to FIG. 13, another configuration of the ball and stud 6, 7 are shown secured to a component 50 of a wheel suspension. The stud 7 has external threads 51. A reinforcing collar nut 104 having internal threads 54 and shown in detail in FIG. 14 is threaded onto the stud 7. The stud 7 is then passed through an aperture 55 in the component 50 and the exposed outer end of the stud 7 is secured by a clamp nut 56.

The construction of the ball stud 6, 7 and collar nut 104 shown in FIGS. 13, 14 and 15 is also effective in transmitting forces throughout the ball stud 6, 7 without damage. Specifically, the stud 7 is also roll-formed during manufacture to form a collar 61 around its mid-section. The collar 61 is formed at a cone angle of about 45 degrees. However, in this embodiment, the transition section 106 from the collar 61 to the ball 6 is substantially cylindrical and measures approximately 0.50 inch in diameter. The collar nut 104 is threaded on the stud 6, and a mating face 108 of the collar nut 52, also formed at a cone angle of about 45 degrees, is seated against the collar 61 with only a low torque. This low torque application of the collar nut 104 avoids simple cantilever loading of the shank of the ball-stud by redistributing the "work-load" to the outer diameter of the collar nut and, therewith, clamping the stabilizing bar 50 between the collar nut and the flanged locknut. It also avoids algebraic addition of the loads on the ball-stud shank. The separate collar nut 104, beside the favorable force distribution, provides a ball stud 6, 7 that does not require machining to achieve proper operating clearance.

The collar nut 104 is formed with a retaining channel 110 around its periphery. The retaining channel 110 is adapted to receive a ridge portion 111 of an elastomeric dust cover 112 in sealing relationship. The inner end of that same dust cover is then seated over the outwardly extending lip 71 on the link end half 46.

The retaining channel 110 is defined by a shoulder 114 formed around the collar nut 104, and a washer 116 secured around the collar nut 104. The washer 116 is secured by upsetting the collar nut surface to form notches 118, 120 which define a washer channel 122.

While preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

We claim:

1. A ball stud for connecting two components of a vehicle suspension system together comprising:
    a) a ball for seating in a socket formed in one suspension component and connecting the ball stud to the one component;
    b) a stud extending from said ball for connecting said ball stud to another suspension component and having a cylindrical portion which is threaded with screw threads;
    c) said stud having a collar formed around it between said threaded portion and said ball;
    d) a frusto-conical face formed on said collar immediately adjacent said threaded portion;
    e) a collar nut having internal threads threaded onto said threaded portion of said stud;
    f) said collar nut having a face and being threaded onto said threaded portion of said stud until said collar nut face engages said frusto-conical collar face;
    g) said threaded portion extending from adjacent said frusto-conical collar face to adjacent an exposed end of the stud and adapted to pass loosely through an aperture in the other suspension component; and
    h) a clamp nut threaded onto said threaded portion from said exposed end for clamping the other suspension component tightly against said collar nut to form a rigid connection between the ball stud and the other suspension component.

2. The ball stud defined in claim 1 further characterized in that:
    i) at least one of said screw threads on said stud has a minor diameter that is approximately equal to a pitch diameter of other screw threads on said stud.

3. The ball stud defined in claim 2 further characterized in that:
    j) at least one of said screw threads on said stud has a minor diameter that is greater than a minor diameter of other screw threads on said stud.

4. The ball stud defined in claim 1 further characterized in that:
    i) at least one of said screw threads on said stud has a minor diameter that is greater than a minor diameter of other screw threads on said stud.

5. The ball stud defined in claim 4 further characterized in that:
    j) a minor diameter of said internal screw threads of said collar nut corresponds to the minor diameter of said at least one screw thread that is greater than the minor diameter of other screw threads on said stud.

6. The ball stud of claim 1 further characterized in that:
    i) said collar nut face is frusto-conical in shape.

7. The ball stud of claim 6 further characterized in that:
    j) said collar nut face is lightly seated against said collar face with a force exerted by a low torque applied to the nut.

8. The ball stud of claim 7 further characterized in that:
    k) said collar face and said collar nut face are disposed at substantially the same angle relative to an axis of the stud.

9. The ball stud of claim 8 further characterized in that:
    l) said angle is 45°.

10. A ball joint assembly for a vehicle suspension system comprising:
    a) a ball having a stud extending therefrom;
    b) screw threads on at least a portion of said stud;
    c) a reinforcing collar formed around an outer surface of said stud and adjacent said screw threads;
    d) a supporting collar nut having inner screw threads, whereby said collar nut is attached to said stud by screwing said collar nut on to the screw threads of said stud, thereby bringing said collar nut into contact with said reinforcing collar and securing said collar nut against said reinforcing collar;
    e) a channel formed around said collar nut by a flange formed unitarily with said collar nut and a removable washer mounted on said collar nut; and
    f) an elastomeric dust cover having an annular ridge portion seated in said channel.

11. The ball joint assembly of claim 10 further characterized in that:
    g) said washer is mounted on a cylindrical surface of said collar nut opposite said flange; and
    h) means on said cylindrical surface holding said washer on said collar nut.

12. The ball joint assembly of claim 11 further characterized by and including:
    i) said means formed on said collar for holding said removable washer on said collar nut includes an upset of material forming said collar nut from said cylindrical surface.

* * * * *